United States Patent
Takenaka et al.

(10) Patent No.: US 9,790,409 B2
(45) Date of Patent: *Oct. 17, 2017

(54) HOT MELT ADHESIVE

(71) Applicant: HENKEL AG & CO. KGAA, Duesseldorf (DE)

(72) Inventors: Makoto Takenaka, Osaka (JP); Ai Takamori, Osaka (JP); Tadashi Hayakawa, Osaka (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/950,253

(22) Filed: Nov. 24, 2015

(65) Prior Publication Data

US 2016/0075924 A1    Mar. 17, 2016

Related U.S. Application Data

(63) Continuation of application No. PCT/JP2014/064896, filed on May 29, 2014.

(30) Foreign Application Priority Data

May 30, 2013   (JP) .................. 2013-114704

(51) Int. Cl.

| | |
|---|---|
| *C09J 167/04* | (2006.01) |
| *C09J 167/00* | (2006.01) |
| *C09J 165/00* | (2006.01) |
| *C09J 123/08* | (2006.01) |
| *C09J 125/08* | (2006.01) |
| *C09J 201/02* | (2006.01) |
| *C08L 67/04* | (2006.01) |
| *C09J 7/04* | (2006.01) |
| *C09J 167/02* | (2006.01) |
| *C09J 123/14* | (2006.01) |
| *C08L 53/02* | (2006.01) |

(52) U.S. Cl.
CPC ............ *C09J 167/04* (2013.01); *C09J 7/043* (2013.01); *C09J 7/045* (2013.01); *C09J 123/08* (2013.01); *C09J 123/0815* (2013.01); *C09J 123/0853* (2013.01); *C09J 123/14* (2013.01); *C09J 125/08* (2013.01); *C09J 165/00* (2013.01); *C09J 167/00* (2013.01); *C09J 167/02* (2013.01); *C09J 201/02* (2013.01)

(58) Field of Classification Search
CPC ...... C09J 123/08; C09J 125/08; C09J 165/00; C09J 167/04

USPC .......................... 525/190; 156/334
See application file for complete search history.

(56) References Cited

U.S. PATENT DOCUMENTS

| | | | | |
|---|---|---|---|---|
| 3,993,613 | A | * | 11/1976 | Doss .................. C09J 153/02 524/274 |
| 5,169,889 | A | | 12/1992 | Kauffmann et al. |
| 5,252,646 | A | | 10/1993 | Iovine et al. |
| 5,312,850 | A | | 5/1994 | Iovine et al. |
| 5,441,999 | A | * | 8/1995 | Jarvis .................. C09J 123/04 524/271 |
| 5,518,571 | A | | 5/1996 | Puerkner et al. |
| 2010/0330315 | A1 | | 12/2010 | Robert |
| 2012/0288658 | A1 | * | 11/2012 | Noak .................. C09J 5/06 428/40.1 |
| 2012/0328805 | A1 | | 12/2012 | Davis |
| 2015/0045489 | A1 | * | 2/2015 | Takenaka .............. C09J 123/26 524/271 |

FOREIGN PATENT DOCUMENTS

| | | |
|---|---|---|
| CN | 1197474 A | 10/1998 |
| JP | 4255779 A | 9/1992 |
| JP | H05339557 A | 12/1993 |
| JP | 6-500350 A | 1/1994 |
| JP | 6-145625 A | 5/1994 |
| JP | 6-320622 A | 11/1994 |
| JP | 6-320623 A | 11/1994 |
| JP | 8-41435 A | 2/1996 |
| JP | 10-251612 A | 9/1998 |
| JP | 2013-227459 A | 9/1998 |
| JP | 10279774 A | 10/1998 |
| JP | 11131037 A | 5/1999 |
| JP | 2001-72749 A | 3/2001 |
| JP | 2002-58949 A | 2/2002 |
| JP | 2002-256250 A | 9/2002 |
| JP | 2004161931 A | 6/2004 |
| JP | 2004256642 A | 9/2004 |
| JP | 2005-220244 A | 8/2005 |
| JP | 2006-70091 A | 3/2006 |

(Continued)

OTHER PUBLICATIONS

INEOS Oligomers: Indopol Polybutene Specifications and Typical Properties (3 Pages, Undated).*

(Continued)

*Primary Examiner* — Fred M Teskin
(74) *Attorney, Agent, or Firm* — Sun Hee Lehmann

(57) ABSTRACT

An object of the present invention is to provide a hot melt adhesive being environmentally-friendly, having excellent adhesion property to various substrates such as paper substrate and polyolefin substrate, as well having excellent thermal stability. The present invention relates to a hot melt adhesive comprising: (A) a polar functional group-modified polymer, (B) an aliphatic polyester-based resin, (C) an olefin-based polymer, and (D) a tackifier resin.

9 Claims, No Drawings

(56) References Cited

FOREIGN PATENT DOCUMENTS

| | | |
|---|---|---|
| JP | 2007-51195 A | 3/2007 |
| JP | 2007-262392 A | 10/2007 |
| JP | 2007262392 A | 10/2007 |
| JP | 2010-90185 A | 4/2010 |
| JP | 2010155951 A | 7/2010 |
| JP | 2010-280878 A | 12/2010 |
| JP | 2012-1624 A | 1/2012 |
| JP | 2012233119 A | 11/2012 |
| WO | 9410257 A1 | 5/1994 |
| WO | 9510577 A1 | 4/1995 |
| WO | 2009100414 A1 | 8/2009 |
| WO | 2009104372 A1 | 8/2009 |
| WO | 2010115564 A1 | 10/2010 |
| WO | 2011129080 A1 | 10/2011 |
| WO | 2013162058 A1 | 10/2013 |
| WO | 2013162059 A1 | 10/2013 |
| WO | WO 2013/162058 A1 * 10/2013 ............ C09J 109/00 |

OTHER PUBLICATIONS

Pang, X. et al. Polylactic acid (PLA): Research, development and industrialization. Biotechnol. J. 2010, vol. 5, 1125-1136.

Xu, J. et al. Poly(butylene succinate) and its copolymers: development and industrialization. Biotechnol. J. 2010 1149-1163.

El-Hadi, Ahmed Mohamed. Development of Novel Biopolymer Blends Based on Poly(L-lactic acid), Poly(R)-3-hydroxybutyrate), and Plasticizer. Polymer Engineering and Science, 2013, Society of Plastic Engineers, Article first published Jul. 2013. Retrieved from http://onlinelibrary.wiley.com/doi/10.1002/pen.v54.6/issuetoc.

* cited by examiner

HOT MELT ADHESIVE

TECHNICAL FIELD OF THE INVENTION

The present invention relates to a hot melt adhesive and more specifically to a hot melt adhesive which has excellent adhesion to substrates such as polyolefin, polyester and the like.

BACKGROUND OF THE INVENTION

A hot melt adhesive is a solvent-less adhesive, which is heat-melted, applied to an adherend, and then solidified by cooling to exhibit adhesion, and thus a hot melt adhesive enables instantaneous adhesion and rapid adhesion, and is applicable in wide variety fields such as paper processing, woodworking, hygienic materials, and electronics.

In recent years, because of an increase in awareness of environmental problems, the replacement of conventional petroleum-derived raw materials by natural materials, plant materials and biodegradable materials has proceeded. In terms of environmental problems, such as global warming due to an increase of carbon dioxide emission, attempts have been made to produce hot melt adhesives using non-petroleum-based resins, such as polylactic acid-based resins, containing no petroleum as a raw material.

Patent document 1 discloses a hot melt adhesive comprising a polylactic acid-based resin, and poly(butylene succinate) or poly(ethylene succinate). Patent document 2 discloses a hot melt adhesive comprising polylactic acid and a polyvinyl alcohol-based resin. Patent document 3 discloses a hot melt adhesive composition that is a composition comprising a thermoplastic resin and a tackifier as main components, wherein either one or both of them comprise a lactic acid copolymer resin derived from polylactic acid or lactic acid and other hydroxycarboxylic acids.

Any of the polylactic acid-based hot melt adhesives in Patent Documents 1 to 3 is suitable for application to paper. The hot melt adhesive in Patent Document 1 is for bookbinding (paragraph number "0001"), and the hot melt adhesive in Patent Document 2 is suitable for packaging paper, packaging container, and corrugated cardboards etc. (paragraph number "0035"). Regarding the hot melt adhesive in Patent Document 3, the adhesion property to corrugated cardboard material is evaluated as shown in a table in Examples.

Meanwhile, a polyolefin-based hot melt adhesive is known as another paper adhesive.

A polylactic acid-based hot melt adhesive tends to be inferior to a polyolefin-based hot melt adhesive in tackiness, adhesion property, and thermal stability, and in particular, has poor adhesion property to a polyolefin substrate for use as a vehicle interior material. Consequently, the polylactic acid-based hot melt adhesives described in Patent Documents 1 to 3 are not be suitably applied to the use for a vehicle interior material.

Blending a polyolefin in a polylactic acid-based hot melt adhesive may be thought as means for enhancing adhesion property to a polyolefin-based substrate. A polylactic acid, however, has problems that it is not easily mixed with a polyolefin, and has poor compatibility with a "tackifier resin" as an additive to a hot melt adhesive, with poor thermal stability.

Patent document 1: Japanese Patent Laid-Open No. 2010-155951
Patent document 2: Japanese Patent Laid-Open No. 2004-256642
Patent document 3: Japanese Patent Laid-Open No. H05 (1993)-339557

SUMMARY OF THE INVENTION

An object of the present invention is to provide a hot melt adhesive which solves the problem, achieving environmental harmony and high thermal stability, with excellent adhesion property to a plastic substrate (polyolefin substrate, in particular), and which can be used in various fields.

The present invention and preferred embodiments of the present invention are as follows.
1. A hot melt adhesive comprising:
   (A) a polar functional group-modified polymer,
   (B) an aliphatic polyester-based resin,
   (C) an olefin-based polymer, and
   (D) a tackifier resin.
2. The hot melt adhesive according to the item 1, wherein the polar functional group is at least one functional group selected from an acid anhydride group, a maleic acid group, a carboxyl group, an amino group, an imino group, an alkoxysilyl group, a silanol group, a silyl ether group, a hydroxyl group and an epoxy group.
3. The hot melt adhesive according to the item 1 or 2, wherein the polar functional group-modified polymer (A) comprises at least one selected from a polar functional group-modified conjugated diene-based polymer and a polar functional group-modified olefin-based polymer.
4. The hot melt adhesive according to any one of the items 1 to 3, wherein the aliphatic polyester-based resin (B) comprises at least one selected from a polylactic acid-based resin and poly(butylene succinate).
5. The hot melt adhesive according to any one of the items 1 to 4, comprising 5 to 60 parts by weight of (C) to 100 parts by weight of total weight of (A) to (D).
6. The hot melt adhesive according to any one of the items 1 to 5, further comprising antioxidant.
7. A polyolefin substrate to which the hot melt adhesive according to any one of the items 1 to 6 has been applied.
8. A vehicle interior material comprising the polyolefin substrate according to the item 7.

According to the present invention, the addition of a polar functional group-modified polymer in a hot melt adhesive improves the compatibility between an aliphatic polyester-based resin, such as a polylactic acid-based resin, and other components. Thus, there is provided a hot melt adhesive being environmentally-friendly, having improved adhesion, thermal stability and the like, and being easily applied to a wide range of types of base materials.

The hot melt adhesive of the present invention comprises at least (A) a polar functional group-modified polymer, (B) an aliphatic polyester-based resin, (C) an olefin-based polymer, and (D) a tackifier resin. Hereinafter, these may be described below as a "component A," a "component B," a "component C", and a "component D", respectively. A "modified polymer" means to include both (i) one in which a functional group is provided after a polymer is obtained and (ii) one in which a functional group is introduced in the process of polymerization.

<(A) Polar Functional Group-Modified Polymer>

In the hot melt adhesive of the present invention, the use of the polar functional group-modified polymer (A) (component A) increases the compatibility between the aliphatic polyester-based resin (B) and other components, such as the olefin-based polymer (C) and tackifier resin (D), and improves the pressure-sensitive adhesiveness, adhesion, thermal stability and the like.

The polar functional group-modified polymer (A) used in the present invention refers to a polymer having at least one polar functional group. The position at which the polar functional group is introduced is not particularly limited, and may be at an end of the polymer or at inside of the polymer other than the ends of the polymer. The polar functional group may be provided to an obtained polymer, or introduced in the process of polymerizing a monomer.

Examples of the "polar functional group" include acid anhydride groups, such as a maleic anhydride group, a carboxyl group, a maleic acid group, an amino group, an imino group, an alkoxysilyl group, a silanol group, a silyl ether group, a hydroxyl group and an epoxy group. Among these, a maleic anhydride group, a maleic acid group, an amino group, an epoxy group and a carboxyl group are preferred.

The polar functional group-modified polymer (A) is not particularly limited, and preferably comprises at least one selected from a polar functional group-modified conjugated diene-based polymer and a polar functional group-modified olefin-based polymer. Two or more of these may be used in combination. These will be described in detail below.

(A1) Polar Functional Group-Modified Conjugated Diene-Based Polymer

A "conjugated diene-based polymer" refers to a polymer having a structural unit based on a conjugated diene compound (conjugated diene unit).

Here, the "conjugated diene compound" means a diolefin compound having at least a pair of conjugated double bonds. Specific examples of the "conjugated diene compound" include 1,3-butadiene, 2-methyl-1,3-butadiene (or isoprene), 2,3-dimethyl-1,3-butadiene, 1,3-pentadiene and 1,3-hexadiene. 1,3-Butadiene and 2-methyl-1,3-butadiene are particularly preferred. These conjugated diene compounds may be used alone or in combination.

In the present invention, the conjugated diene-based polymer may have, in addition to the conjugated diene unit, structural units based on other monomers. Examples of other monomers include vinyl-based aromatic hydrocarbons, vinyl nitrile and unsaturated carboxylate esters.

In the present invention, the "conjugated diene-based polymer" is not particularly limited as long as the hot melt adhesive targeted by the present invention can be obtained. For example, a copolymer in which a vinyl-based aromatic hydrocarbon and a conjugated diene compound are block-copolymerized, that is, one having a vinyl-based aromatic hydrocarbon block and a conjugated diene compound block, is preferred.

The "vinyl-based aromatic hydrocarbon" means an aromatic hydrocarbon compound having a vinyl group. Specific examples thereof include styrene, o-methylstyrene, p-methylstyrene, p-tert-butylstyrene, 1,3-dimethylstyrene, α-methylstyrene, vinylnaphthalene and vinylanthracene. Particularly, styrene is preferred. These vinyl-based aromatic hydrocarbons may be used alone or in combination.

In the present invention, the conjugated diene-based polymer constituting the polar functional group-modified conjugated diene-based polymer contained as the component A may be a non-hydrogenated conjugated diene-based polymer or a hydrogenated conjugated diene-based polymer, and a hydrogenated conjugated diene-based polymer is more preferred.

Examples of the "non-hydrogenated conjugated diene-based polymer" include a styrene-isoprene-styrene block copolymer (also referred to as "SIS") and a styrene-butadiene-styrene block copolymer (also referred to as "SBS"). Examples of the "hydrogenated conjugated diene-based polymer" can include a hydrogenated styrene-isoprene-styrene block copolymer (that is, also referred to as the styrene-ethylene/propylene-styrene block copolymer "SEPS") and a hydrogenated styrene-butadiene-styrene block copolymer (that is, also referred to as the styrene-ethylene/butylene-styrene block copolymer "SEBS"). Among these, SEBS is preferred, and SEBS having a styrene content of 3 to 40% by weight is more preferred for the conjugated diene-based polymer constituting the polar functional group-modified conjugated diene-based polymer contained as the A component.

Examples of the "polar functional group" of the "polar functional group-modified conjugated diene-based polymer" include acid anhydride groups, such as a maleic anhydride group, a carboxyl group, a maleic acid group, an amino group, an imino group, an alkoxysilyl group, a silanol group, a silyl ether group, a hydroxyl group and an epoxy group. Among these, a maleic acid group and an amino group are more preferred.

As a method for producing the polar functional group-modified conjugated diene-based polymer, the polar functional group-modified conjugated diene-based polymer may be produced by synthesizing a conjugated diene-based polymer first, and introducing a polar functional group later, or by performing a copolymerization reaction using a monomer containing a polar functional group.

Examples of the "polar functional group-modified conjugated diene-based polymer" include amino group-modified SEBS and maleic acid group-modified SEBS. In a polar functional group-modified conjugated diene-based copolymer, the position at which a polar group, such as an amino group or a maleic acid group, is introduced is not particularly limited. For example, the polar group is preferably introduced into at least one end of the conjugated diene-based copolymer.

As the polar functional group-modified conjugated diene-based copolymer, commercial products may be used. Examples thereof include Tuftec MP10 manufactured by Asahi Kasei Chemicals Corporation, DYNARON 8630P manufactured by JSR and Tuftec M1913 manufactured by Asahi Kasei Chemicals Corporation.

(A2) Polar Functional Group-Modified Olefin-Based Polymer

In the present invention, an "olefin-based polymer" means a polymer having a structural unit based on an olefin, and may be an olefin homopolymer or a copolymer obtained by copolymerizing a compound copolymerizable with an olefin. In the present invention, preference is given to an olefin-based copolymer containing an olefin in an amount of 50% by weight or more, preferably 80% by weight or more, and containing a compound copolymerizable with an olefin in an amount of less than 50% by weight, preferably less than 20% by weight. Compounds corresponding to the above "polar functional group-modified conjugated diene-based polymer" herein are not included in the "polar functional group-modified olefin-based polymer".

As the olefin, ethylene or an α-olefin having 3 to 20 carbon atoms is preferred. Examples of the α-olefin having 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene and combinations thereof. While these may be used alone or in combination of two or more of these, ethylene is preferably contained as the olefin.

In the present invention, the olefin-based polymer may contain a structural unit based on a compound copolymerizable with an olefin to the extent that the object of the present invention is not impaired. Examples of the compound copolymerizable with an olefin include unsaturated carboxylic acids or derivatives thereof and vinyl carboxylates, specifically, unsaturated carboxylic acids or derivatives thereof including acrylic acid, methacrylic acid and (meth)acrylates (for example, methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, t-butyl acrylate, t-butyl methacrylate, 2-ethylhexyl acrylate, 2-ethylhexyl methacrylate, cyclohexyl acrylate, cyclohexyl methacrylate, isobornyl acrylate, isobornyl methacrylate, lauryl acrylate, lauryl methacrylate, stearyl acrylate, stearyl methacrylate, hydroxyethyl acrylate, hydroxyethyl methacrylate, hydroxypropyl acrylate, hydroxypropyl methacrylate, acrylates or methacrylates of polyethylene glycol and polypropylene glycol, trimethoxysilylpropyl acrylate, trimethoxysilylpropyl methacrylate, methyldimethoxysilylpropyl acrylate, methyldimethoxysilylpropyl methacrylate, methyl α-hydroxymethylacrylate, dimethylaminoethyl acrylate and dimethylaminoethyl methacrylate); and vinyl carboxylates including monofunctional aliphatic vinyl carboxylates (for example, vinyl formate, vinyl acetate, vinyl propionate, vinyl butyrate, vinyl caproate, vinyl caprylate, vinyl caprate, vinyl laurate, vinyl myristate, vinyl palmitate, vinyl stearate, isopropenyl acetate, 1-butenyl acetate, vinyl pivalate, vinyl 2-ethylhexanoate and vinyl cyclohexanecarboxylate), aromatic vinyl carboxylates (for example, vinyl benzoate and vinyl cinnamate), and polyfunctional vinyl carboxylates (for example, vinyl monochloroacetate, divinyl adipate, vinyl methacrylate, vinyl crotonate and vinyl sorbate). Among these, methyl acrylate is preferred. These may be used alone or in combination of two or more of these.

Examples of the "polar functional group" of the "polar functional group-modified olefin-based polymer" include acid anhydride groups, such as a maleic anhydride group, a carboxyl group, a maleic acid group, an amino group, an imino group, an alkoxysilyl group, a silanol group, a silyl ether group, a hydroxyl group and an epoxy group. Among these, a maleic anhydride group and an epoxy group are preferred, and an epoxy group is particularly preferred.

As a method for producing the polar functional group-modified polyolefin-based polymer, the polar functional group-modified polyolefin-based polymer may be produced by synthesizing a polyolefin-based polymer, and introducing a polar functional group later, or by performing a copolymerization reaction using a monomer containing a polar functional group. As the monomer containing a polar functional group, for example, glycidyl methacrylate is preferred.

Examples of the "polar functional group-modified olefin-based polymer" include an ethylene/methyl acrylate/glycidyl methacrylate copolymerized resin, an ethylene-glycidyl methacrylate-styrene copolymer and a maleic anhydride-modified polyethylene copolymer. In the polar functional group-modified olefin-based polymer, the position at which a polar functional group, such as an epoxy group or a maleic anhydride group, is introduced is not particularly limited. The polar functional group may be introduced into an end of the polymer or into the structural unit at inside of the polymer other than the ends of the polymer.

As the polar functional group-modified polyolefin-based resin, commercial products may be used. Examples thereof include BONDFAST 7M manufactured by Sumitomo Chemical Co., Ltd., MODIPER A4100 manufactured by NOF CORPORATION and Fusabond N525 manufactured by DuPont.

In the present invention, a polymer having an aliphatic polyester structure as a moiety (in particular, a polymer having an aliphatic polyester moiety as main constituent) is classified into a component B, which is different from a component A.

In the present invention, the component A preferably comprises a polar functional group-modified polymer having a weight average molecular weight (Mw) of $1.0 \times 10^4$ to $3.0 \times 10^5$, and particularly preferably of $2.0 \times 10^4$ to $2.0 \times 10^5$.

The weight average molecular weight is measured by gel permeation chromatography (GPC) using a calibration curve using monodisperse molecular weight polystyrene as a standard substance to convert molecular weight.

In the hot melt adhesive of the present invention, the component A is blended in an amount of preferably 1 to 20 weight parts, more preferably 2 to 10 weight parts, relative to 100 weight parts of the total of components A to D.

<(B) Aliphatic Polyester-Based Resin>

In the hot melt adhesive of the present invention, the use of the aliphatic polyester-based resin (B) (component B) is effective to reduce the content of a material made from petroleum and the like, and therefore the environmental load can be reduced.

As the aliphatic polyester-based resin (B), known resins can be used. Examples thereof include polylactic acid-based resins, poly(butylene succinate), poly(butylene succinate-adipate), poly(butylene succinate-terephthalate), poly(ethylene succinate), poly(butylene succinate-carbonate), polyglycolic acid, polycaprolactone, polyhydroxybutyric acid, polyhydroxyvaleric acid and a hydroxybutyric acid-hydroxyvaleric acid copolymer. Among these, polylactic acid-based resins, poly(butylene succinate) and polyhydroxybutyric acid are preferred, and polylactic acid resins and poly(butylene succinate) are more preferred. These may be used alone or in combinations of two or more.

The above polylactic acid-based resin is a polymer comprising L-lactic acid and/or D-lactic acid as main constituents, and may comprise other copolymerization components other than lactic acid. Examples of such other copolymerization component units include polyvalent carboxylic acids, polyhydric alcohols, hydroxycarboxylic acids and lactones. Specific examples are units produced from polyvalent carboxylic acids, such as oxalic acid, malonic acid, succinic acid, glutaric acid, adipic acid, azelaic acid, sebacic acid, dodecanedionic acid, fumaric acid, cyclohexanedicarboxylic acid, terephthalic acid, isophthalic acid, phthalic acid, 2,6-naphthalenedicarboxylic acid, anthracenedicarboxylic acid, 5-sodium sulfoisophthalic acid and 5-tetrabutylphosphonium sulfoisophthalic acid; polyhydric alcohols, such as ethylene glycol, propylene glycol, butanediol, heptanediol, hexanediol, octanediol, nonanediol, decanediol, 1,4-cyclohexanedimethanol, neopentyl glycol, glycerin, pentaerythritol, aromatic polyhydric alcohols obtained by the addition reaction of bisphenol A or bisphenol with ethylene oxide, diethylene glycol, triethylene glycol, polyethylene glycol, polypropylene glycol and polytetramethylene glycol; hydroxycarboxylic acids, such as glycolic acid, 3-hydroxybutyric acid, 4-hydroxybutyric acid, 4-hydroxyvaleric acid, 6-hydroxycaproic acid and hydroxybenzoic acid; and lactones, such as glycolide, ε-caprolactone glycolide, ε-caprolactone, β-propiolactone, δ-butyrolactone, β- or γ-butyrolactone, pivalolactone and δ-valerolactone, and the like. The content of such other copolymerization units other than lactic acid is generally preferably 0 to 30 mol %, preferably 0 to 10 mol %, based on 100 mol % of total monomer units.

In the hot melt adhesive of the present invention, component B is blended in an amount of preferably 5 to 50 parts by weight, and more preferably 10 to 35 parts by weight, based on 100 parts by weight of the total amount of the components A to D.

<(C) Olefin-Based Polymer>

By comprising an olefin-based polymer (C), the hot melt adhesive of the present invention has improved adhesion to a polyolefin substrate. Having improved adhesion to a polyolefin substrate, the hot melt adhesive of the present invention may be suitable for manufacturing vehicle interior material and hygienic material which are formed of polyolefin.

The olefin-based polymer (C) herein is not modified with a polar functional group. Accordingly, the "olefin-based polymer (C)" is clearly distinguished from "a polar functional group-modified olefin-based polymer (A2)".

The same explanation and the specific examples of "olefin" described in "(A2) Polar functional group-modified olefin-based polymer" can also apply to the "olefin" of the olefin-based polymer (C).

In the present invention, the olefin-based polymer (C) may be either a homopolymer or a copolymer, preferably including an ethylene-based copolymer. An "ethylene-based copolymer" herein means a copolymer of ethylene and other polymerizable monomer(s).

The "other polymerizable monomer" means a monomer having a double bond between carbon atoms which enables addition polymerization with ethylene.

Specific examples of the "other polymerizable monomer" include an "olefin-based hydrocarbon except for ethylene" and a "carboxylate ester having an ethylenic double bond".

Examples of the "olefin-based hydrocarbon except for ethylene" include α-olefin having 3 to 20 carbon atoms, and specifically include propylene, 1-butene, 1-pentene, 1-hexene, 1-heptene, 1 octene, 1-nonene, 1-decene, cis-2-butene, trans-2-butene, isobutylene, cis-2-pentene, trans-2-pentene, 3-methyl-1-butene, 2-methyl-2-butene, and 2,3-dimethyl-2-butene.

Examples of the "carboxylate ester having an ethylenic double bond" include (meth)acrylate ester such as methyl (meth)acrylate, butyl (meth)acrylate, and 2-ethylhexyl (meth)acrylate, and vinyl carboxylate and allyl ester such as vinyl acetate and allyl acetate.

The "other polymerizable monomer" may be used singly or in combination of two or more.

In the present invention, the ethylene-based copolymer preferably includes a "copolymer of ethylene and an olefin except for ethylene". Accordingly, the "other polymerizable monomer" is preferably an "olefin-based hydrocarbon except for ethylene", particularly α-olefin having 3 to 20 carbon atoms, more preferably propylene, butene, and octene.

Examples of the "copolymer of ethylene and an olefin except for ethylene" preferably include a copolymer of ethylene and an α-olefin having 3 to 20 carbon atoms, and specifically a copolymer of ethylene and octene, a copolymer of ethylene, propylene and 1-butene, a copolymer of ethylene and propylene, and a copolymer of ethylene and butene, more preferably a copolymer of ethylene and octene, and a copolymer of ethylene, propylene and 1-butene, and particularly preferably a copolymer of ethylene, propylene and 1-butene. The copolymers of ethylene and an olefin except for ethylene may be used singly or in combination of two or more. A commercialized product may be used as the copolymer of ethylene and an olefin.

Examples of the "copolymer of ethylene, propylene and 1-butene" include VESTO PLAST 703 (trade name) and VESTO PLAST 708 (trade name) made by Evonik Degussa Co., Ltd.

Examples of the "copolymer of ethylene and octene" include AFFINITY GA1900 (trade name), AFFINITY GA1950 (trade name), AFFINITY EG8185 (trade name), AFFINITY EG8200 (trade name), ENGAGE 8137 (trade name), ENGAGE 8180 (trade name), and ENGAGE 8400 (trade name) made by Dow Chemical Company.

Examples of the "copolymer of ethylene and propylene" include EASTOFLEX E1016PL-1 made by Eastman Chemical Company.

In the present invention, the ethylene-based copolymer may include a copolymer of ethylene and at least one selected from the "carboxylate ester having an ethylenic double bond", which may be a commercialized product, and may be used singly or in combination of two or more kinds.

Examples of the "copolymer of ethylene and a carboxylate ester having an ethylenic double bond" include an ethylene-vinyl acetate copolymer, an ethylene-methyl methacrylate copolymer, an ethylene-2-ethylhexyl acrylate copolymer, an ethylene-butyl acrylate copolymer, and an ethylene-butyl methacrylate copolymer. Among them, an ethylene-vinyl acetate copolymer and ethylene-methyl methacrylate copolymer are more preferred, and an ethylene-vinyl acetate copolymer is particularly preferred.

In the hot melt adhesive of the present invention, the component C is blended in an amount of preferably 5 to 60 weight parts, relative to 100 weight parts of the total of components A to D. By comprising the olefin-based polymer (C) within the range, an adhesion property to polyolefin substrate of the hot melt adhesive is improved.

<(D) Tackifier Resin>

In the hot melt adhesive of the present invention, the use of the tackifier resin (D) (component D) improves the pressure-sensitive adhesiveness. The "tackifier resin" is not particularly limited as long as it is generally used in hot melt adhesives and provides the hot melt adhesive targeted by the present invention.

Examples of the tackifier resin can include natural rosins, modified rosins, hydrogenated rosins, glycerol esters of natural rosins, glycerol esters of modified rosins, pentaerythritol esters of natural rosins, pentaerythritol esters of modified rosins, pentaerythritol esters of hydrogenated rosins, copolymers of natural terpenes, three-dimensional polymers of natural terpenes, hydrogenated derivatives of copolymers of hydrogenated terpenes, polyterpene resins, hydrogenated derivatives of phenol-based modified terpene resins, aliphatic petroleum hydrocarbon resins, hydrogenated derivatives of aliphatic petroleum hydrocarbon resins, aromatic petroleum hydrocarbon resins, hydrogenated derivatives of aromatic petroleum hydrocarbon resins, cyclic aliphatic petroleum hydrocarbon resins and hydrogenated derivatives of cyclic aliphatic petroleum hydrocarbon resins. These tackifier resins may be used alone or in combination. For the tackifier resin, liquid type tackifier resins can also be used as long as they are colorless to pale yellow in color tone, have substantially no odor, and have good thermal stability.

Considering these properties comprehensively, hydrogenated derivatives of resins and the like are preferred as the tackifier resin.

As the tackifier resin, commercial products may be used. Examples of such commercial products include MARUKA-CLEAR H (trade name) manufactured by Maruzen Petrochemical Co., Ltd., Clearon K100 (trade name) manufactured by YASUHARA CHEMICAL Co., Ltd., ARKON M100 (trade name) manufactured by Arakawa Chemical Industries, Ltd., I-MARV S100 (trade name) manufactured by Idemitsu Kosan Co., Ltd., Clearon K4090 (trade name), Clearon K4100 and Clearon M105 (trade name) manufactured by YASUHARA CHEMICAL Co., Ltd., ECR5380 (trade name), ECR179EX (trade name), ECR5400 (trade name) and ECR5600 (trade name) manufactured by Exxon Mobil Corporation, Regalite R7100 (trade name) and Easttack H-100W (trade name) manufactured by Eastman Chemical Company, ECR179X (trade name) manufactured by Exxon, ARKON P100 (trade name) manufactured by Arakawa Chemical Industries, Ltd., I-marv S110 (trade name) and I-marv Y135 (trade name) and I-marv P100 (trade name) manufactured by Idemitsu Kosan Co., Ltd., Easttack C100-R (trade name) manufactured by Easttack and KR-85 (trade name) manufactured by Arakawa Chemical Industries, Ltd. These commercial tackifier resins may be used singly or in combination.

In the hot melt adhesive of the present invention, the blending ratio of the component D is preferably 20 to 60 parts by weight, more preferably 30 to 50 parts by weight, based on 100 parts by weight of the total amount of the components A to D.

The hot melt adhesive of the present invention is only required to include the component A to the component D. In a preferred embodiment, the component A includes an amino group-modified conjugated diene-based copolymer, and the component B includes a polylactic acid.

In a particularly preferred embodiment of the present invention, the hot melt adhesive comprises the component A including an amino group-modified styrene-ethylene/butylene-styrene block copolymer ("SEBS"), the component B including a polylactic acid, and the component C including a copolymer of ethylene and an α-olefin having a carbon number of 3 to 20.

In a most preferred embodiment of the present invention, the hot melt adhesive includes the component A including an amino group-modified styrene-ethylene/butylene-styrene block copolymer ("SEBS"), the component B including a polylactic acid, and the component C including a copolymer of ethylene, propylene, and 1-butene.

The hot melt adhesive of the present invention preferably comprises a stabilizing agent (E) (hereinafter also referred to as "component E") in addition to the component A, the component B, the component C and the component D. The blending ratio of the component E is preferably 0.1 to 2.0 parts by weight, more preferably 0.2 to 0.5 parts by weight, based on 100 parts by weight of the total amount of the components A to E.

The "stabilizer" is blended to prevent reduction of molecular weight by heating, gelation, coloration, generation of an odor and the like in the hot melt adhesive to improve the stability of the hot melt adhesive. The "stabilizer" is not particularly limited as long as the hot melt adhesive targeted by the present invention can be obtained. Examples of the "stabilizer" include an antioxidant and an ultraviolet absorbing agent.

The "ultraviolet absorbing agent" is used to improve the light resistance of the hot melt adhesive. The "antioxidant" is used to prevent the oxidative degradation of the hot melt adhesive. The antioxidant and the ultraviolet absorbing agent are not particularly limited, and can be used as long as they are generally used in disposable products, and the targeted disposable product described later can be obtained.

Examples of the antioxidant include phenol-based antioxidants, sulfur-based antioxidants and phosphorus-based antioxidants. Examples of the ultraviolet absorbing agent include benzotriazole-based ultraviolet absorbing agents and benzophenone-based ultraviolet absorbing agents. Further, a lactone-based stabilizer may also be added. These may be used alone or in combination. As commercial products of antioxidants, the following products may be used.

Specific examples thereof include SUMILIZER GM (trade name), SUMILIZER TPD (trade name) and SUMILIZER TPS (trade name) manufactured by Sumitomo Chemical Co., Ltd., IRGANOX 1010 (trade name), IRGANOX HP2225FF (trade name), IRGAFOS 168 (trade name), IRGANOX 1520 (trade name) and TINUVIN P manufactured by Ciba Specialty Chemicals, JF77 (trade name) manufactured by Johoku Chemical Co., Ltd., TOMINOX TT (trade name) manufactured by API Corporation and AO-412S (trade name) manufactured by ADEKA CORPORATION. These stabilizers may be used alone or in combination.

The hot melt adhesive of the present invention may further comprise a fine particle filler. The fine particle filler may be a generally used one, and is not particularly limited as long as the hot melt adhesive targeted by the present invention can be obtained. Examples of the "fine particle filler" include mica, calcium carbonate, kaolin, talc, titanium oxide, diatomaceous earth, urea-based resins, styrene beads, fired clay and starch. The shape of these is preferably a spherical shape, and their sizes (diameter in the case of a spherical shape) are not particularly limited.

The hot melt adhesive according to the present invention may be produced by blending the component A, the component B, the component C and the component D and preferably the component E and further various additives as required, using a generally known method for producing a hot melt adhesive. For example, the hot melt adhesive according to the present invention may be produced by blending predetermined amounts of the above-described components, and heating and melting them. The order of adding the components, the heating method and the like are not particularly limited as long as the targeted hot melt adhesive is obtained.

As a further preferred mode of the present invention, the hot melt adhesive preferably has a viscosity (or melt viscosity) at 200° C. of 100000 mPa·s or less, particularly preferably less than 30000 mPa·s. The viscosity allowing application of uniform coating with the hot melt adhesive is 30000 mPa·s or less, and the viscosity allowing easy application of uniform coating is less than 20000 mPa·s. With the viscosity at 200° C. in the above range, the hot melt adhesive is much more suitable for coating. The viscosity (or melt viscosity) at 200° C. herein means a value measured by a Brookfield viscometer using a No. 27 rotor.

The hot melt adhesive of the present invention is widely used in paper processing, bookbinding, a disposable product, a vehicle interior material and the like. The hot melt adhesive is effectively used for a vehicle interior material, in particular, because the adhesive has excellent adhesion property to a polyolefin substrate.

The vehicle interior material of the present invention is generally manufactured by attaching a substrate to an adherend with the hot melt adhesive. In attaching the adherend to the substrate of plastic material, the hot melt adhesive may be applied to the substrate-side or the adherend-side. In the present invention, the "substrate" of a vehicle interior material is preferably made of polyolefin. The "adherend" is not specifically limited, but is preferably a fiber material. The fiber material means a sheet-like material of synthetic fiber or natural fiber woven with a spinning machine.

Use of any special device is not required for manufacturing the vehicle interior material of the present invention. Generally known manufacturing devices including a carrier machine, a coater, a pressing machine, a heater, and a cutting machine may be used in manufacturing.

Application methods are not limited as long as the targeted hot melt adhesive is obtained. Such application methods may be broadly divided into contact application and noncontact application. The "contact application" refers to an application method in which an ejection machine is brought into contact with a member or a film when the hot melt adhesive is applied. The "noncontact application" refers to an application method in which an ejection machine is not brought into contact with a member or a film when the hot melt adhesive is applied. Examples of the contact application method may include slot coater coating and roll coater coating. Examples of the noncontact application method may include spiral coating which allows coatings in the form of a spiral, omega coating and control seam coating which allows coatings in the form of a wave, slot spray coating and curtain spray coating which allows coatings in the form of a plane, and dot coating which allows coatings in the form of dots.

EXAMPLES

For the purpose of describing the present invention in more details and more specifically, the present invention will be described below using Examples. These Examples are for describing the present invention, and do not limit the present invention in any way.

Components blended in hot melt adhesives in Examples and Comparative Examples are shown below.

<(A) Polar Functional Group-Modified Polymers>

(A1) Polar functional group-modified conjugated diene-based copolymers (A1-1) amino group-modified SEBS ("DYNARON 8630P" manufactured by JSR)

(A1-2) maleic acid group-modified SEBS ("Tuftec M1913" manufactured by Asahi Kasei Chemicals Corporation)

(A2) Polar functional group-modified polyolefin-based polymers (A2-1) Ethylene/methyl acrylate/glycidyl methacrylate copolymerized resin ("BONDFAST 7M" (trade name) manufactured by Sumitomo Chemical Co., Ltd.)

<(B) Aliphatic Polyester-Based Resins>

(B1) Poly LD-lactic acid resin ("4060D" (trade name) manufactured by NatureWorks LLC)

(B2) Poly(butylene succinate) resin ("AD92W" (trade name) manufactured by Mitsubishi Chemical Corporation)

<(C) Olefin-Based Polymer>

(C1) Propylene/ethylene/1-butene copolymer ("VESTO PLAST 708" manufactured by Evonik Degussa Co., Ltd.)

(C2) Ethylene/octene copolymer ("AFFINITY GA1950" manufactured by Dow Chemical Company)

(C3) Ethylene/vinyl acetate copolymer ("ULTRASEN 722" manufactured by Tosoh Corporation)

(C4) Polyethylene ("PETROSEN 249" manufactured by Tosoh Corporation)

(C5) Polypropylene ("PM940M" manufactured by SunAllomer Ltd.)

<(D) Tackifier Resins>

(D1) a hydrogenated aromatic petroleum resin ("I-marv P100" (trade name) manufactured by Idemitsu Kosan Co., Ltd.)

(D2) C5-based petroleum resin ("EAST TACK H-100W" manufactured by Eastman Chemical Company)

(D3) Hydrogenated terpene-based resin ("CLEARON M105," made by Yasuhara Chemical Co., Ltd.)

<(E) Antioxidants>

(E1) Antioxidant (AO-60 manufactured by ADEKA CORPORATION)

These components (A) to (E) were blended in blending proportions shown in Table 1 to Table 3, and melted and mixed at about 160° C. over about 3 hours using a universal stirrer to produce the hot melt adhesives of Examples 1 to 8 and Comparative Examples 1 to 5. The numerical values regarding the composition (blend) of the hot melt adhesives shown in Tables 1 to 3 are all parts by weight.

Each of the hot melt adhesives in Examples and Comparative Examples was evaluated for the thermal stability, the peel strength to various substrates, and the shear strength. The summary of each of the evaluation is described in the following.

<Shear Adhesion Strength (PET/PET and PP/PP)>

The adhesion property of a hot melt adhesive was evaluated from the tensile shear strength to an adherend of PET or polypropylene (PP). Each of the adherend for use had a strip shape with a width of 25 mm, a length of 100 mm, and a thickness of 2 mm. The hot melt adhesive was melted in air at 180° C. Two of the adherends were laminated so as to form a sample piece having an application area of 25 mm square with a thickness of 2 mm.

The tensile shear strength of the sample piece left intact for 1 day in a room at 23° C. was measured with a UR-500L load cell (maximum load: 500 kg) made by Orientec Co., Ltd., and an RTM-250 testing machine made by Orientec Co., Ltd., at a stroke velocity of 300 mm/min. The evaluation criteria are as follows.

∘∘: more than 1.0 MPa
∘: 0.5 MPa or more and 1.0 MPa or less
Δ: 0.2 MPa or more and less than 0.5 MPa
x: less than 0.2 MPa, or unmeasurable due to no formation of hot melt <180° Peel Strength: PP Plate/Polyester Nonwoven Fabric>

The adhesion property of a hot melt adhesive was evaluated from the peel strength to an adherend of PP plate/polyester nonwoven fabric. The hot melt adhesive was melted in air at 180° C. and applied to a PP substrate with an amount applied of 0.30 g/inch, which was then attached to a polyester nonwoven fabric so as to form a sample piece.

The 180° peel strength of the sample piece left intact for 1 day in a room at 23° C. was measured with a UR-500L load cell (maximum load: 500 kg) made by Orientec Co., Ltd., and an RTM-250 testing machine made by Orientec Co., Ltd., at a stroke velocity of 300 mm/min. The evaluation criteria are as follows.

∘∘: more than 10 kg/inch
∘: more than 5 kg/inch and 10 kg/inch or less
Δ: more than 0 kg/inch and 5 kg/inch or less
x: 0 kg/inch or unmeasurable due to no formation of hot melt <Adhesion: Paper/Paper>

The adhesion property of a hot melt adhesive was evaluated from the peel strength to adherend of paper (K liner corrugated cardboard). A hot melt adhesive melted at 180° C. in the air was applied to the paper substrate with an application amount of 0.15 g/inch and the paper substrates were laminated to produce a sample piece.

The 90° peel strength of the sample piece left intact for 1 day in a room at 23° C. was measured with a UR-500L load cell (maximum load: 500 kg) made by Orientec Co., Ltd., and an RTM-250 testing machine made by Orientec Co., Ltd., at a stroke velocity of 300 mm/min. The evaluation criteria are as follows. "Material breakage" means that the sample piece is broken, and "interface breakage" means that the sample piece is detached from the interface with the adhesive layer without breakage.

∘∘: Peel strength was more than 1.0 kg/inch and material breakage occurred.

∘: Peel strength was more than 1.0 kg/inch and interface breakage occurred.

Δ: Peel strength was 0.5 kg/inch or more and less than 1.0 kg/inch and interface breakage occurred.

x: Peel strength was less than 0.5 kg/inch and interface breakage occurred, or peel strength was unmeasurable due to no formation of hot melt adhesive.

<Thermal Stability>

The thermal stability was visually determined by a change in appearance after 35 g of the hot melt adhesive was placed in a 70 mL glass bottle and allowed to stand in a dryer oven at 150° C. for 24 hours.

∘∘: Phase separation, carbonized product or ring (a degraded product of the hot melt adhesive deposited in a ring shape) was not observed.

∘: Phase separation, carbonized product and a ring were very slightly observed.

Δ: Phase separation, carbonized product and a ring were slightly observed.

x: Phase separation, carbonized product and a ring were observed.

TABLE 1

|  | Ex. 1 | Ex. 2 | Ex. 3 | Ex. 4 |
|---|---|---|---|---|
| (A1-1) | 5 |  |  | 5 |
| (A1-2) |  | 10 |  |  |
| (A2-1) |  |  | 2 |  |
| (B1) | 25 | 25 | 25 |  |
| (B2) |  |  |  | 35 |
| (C1) | 30 |  |  | 20 |
| (C2) |  | 25 | 33 |  |
| (C3) |  |  |  |  |
| (C4) |  |  |  |  |
| (C5) |  |  |  |  |
| (D1) | 40 | 40 | 40 |  |
| (D2) |  |  |  | 40 |
| (D3) |  |  |  |  |
| (E1) | 0.5 | 0.5 | 0.5 | 0.5 |
| total (parts by weight) | 100.5 | 100.5 | 100.5 | 100.5 |
| Shear adhesion strength PP/PP |  |  |  |  |
| (MPa) | >1.0 | >1.0 | >1.0 | >1.0 |
| Evaluation | ∘∘ | ∘∘ | ∘∘ | ∘∘ |
| Shear adhesion strength PET/PET |  |  |  |  |
| (MPa) | >1.0 | >1.0 | >1.0 | >1.0 |
| Evaluation | ∘∘ | ∘∘ | ∘∘ | ∘∘ |
| 180° Peel strength PP/polyester nonwoven fabric |  |  |  |  |
| (kg/inch) | >10 | >10 | >10 | >10 |
| Evaluation | ∘∘ | ∘∘ | ∘∘ | ∘∘ |
| Peel strength paper/paper |  |  |  |  |
| (kg/inch) | 1.2 material breakage | 1.3 material breakage | 1.2 material breakage | 1.3 material breakage |
| Evaluation | ∘∘ | ∘∘ | ∘∘ | ∘∘ |
| Thermal stability 150° C. × 1 day | ∘∘ | ∘ | ∘ | ∘∘ |

Ex. = Example

TABLE 2

|  | Ex. 5 | Ex. 6 | Ex. 7 | Ex. 8 |
|---|---|---|---|---|
| (A1-1) | 5 | 5 | 5 | 5 |
| (A1-2) |  |  |  |  |
| (A2-1) |  |  |  |  |
| (B1) | 25 | 25 | 10 | 10 |
| (B2) |  |  |  |  |
| (C1) |  |  |  | 40 |
| (C2) | 30 |  | 45 |  |
| (C3) |  | 30 |  |  |
| (C4) |  |  | 5 |  |
| (C5) |  |  |  | 5 |
| (D1) | 40 | 40 |  |  |
| (D2) |  |  |  |  |
| (D3) |  |  | 35 | 40 |
| (E1) | 0.5 | 0.5 | 0.5 | 0.5 |
| Total (parts by weight) | 100.5 | 100.5 | 100.5 | 100.5 |
| Shear adhesion strength PP/PP |  |  |  |  |
| (MPa) | >1.0 | >1.0 | >1.0 | >1.0 |
| Evaluation | ∘∘ | ∘∘ | ∘∘ | ∘∘ |
| Shear adhesion strength PET/PET |  |  |  |  |
| (MPa) | >1.0 | >1.0 | >1.0 | >1.0 |
| Evaluation | ∘∘ | ∘∘ | ∘∘ | ∘∘ |
| 180° Peel strength PP/polyester nonwoven fabric |  |  |  |  |
| (kg/inch) | >10 | >10 | >10 | >10 |
| Evaluation | ∘∘ | ∘∘ | ∘∘ | ∘∘ |
| Peel strength paper/paper |  |  |  |  |
| (kg/inch) | 1.3 material breakage | 1.1 material breakage | 1.4 material breakage | 1.4 material breakage |
| Evaluation | ∘∘ | ∘∘ | ∘∘ | ∘∘ |
| Thermal stability 150° C. × 1 day | ∘∘ | ∘∘ | ∘∘ | ∘∘ |

Ex. = Example

TABLE 3

|  | Com-Ex. 1 | Com-Ex. 2 | Com-Ex. 3 | Com-Ex. 4 | Com-Ex. 5 |
|---|---|---|---|---|---|
| (A1-1) |  |  | 5 | 5 | 5 |
| (A1-2) |  |  |  |  |  |
| (A2-1) |  |  |  |  |  |
| (B1) | 30 | 30 |  | 25 | 25 |
| (B2) |  |  |  |  |  |
| (C1) |  | 30 |  |  |  |

TABLE 3-continued

|  | Com-Ex. 1 | Com-Ex. 2 | Com-Ex. 3 | Com-Ex. 4 | Com-Ex. 5 |
|---|---|---|---|---|---|
| (C2) |  | 30 |  |  |  |
| (C3) |  |  |  |  |  |
| (C4) |  |  |  |  |  |
| (C5) |  |  | 50 | 70 |  |
| (D1) | 40 | 40 | 45 |  | 70 |
| (D2) |  |  |  |  |  |
| (D3) |  |  |  |  |  |
| (E1) | 0.2 | 0.2 | 0.2 | 0.2 | 0.2 |
| Total (parts by weight) | 100.2 | 100.2 | 100.2 | 100.2 | 100.2 |
| Shear adhesion strength PP/PP |  |  |  |  |  |
| (MPa) | N | N | 0.0 | 0.1 | 0.0 |
| Evaluation | x | x | x | x | x |
| Shear adhesion strength PET/PET |  |  |  |  |  |
| (MPa) | N | N | 0.0 | 0.1 | 0.1 |
| Evaluation | x | x | x | x | x |
| 180° Peel strength PP/polyester nonwoven fabric |  |  |  |  |  |
| (kg/inch) | N | N | 5.0 | 0.0 | 0.0 |
| Evaluation | x | x | Δ | x | x |
| Peel strength paper/paper |  |  |  |  |  |
| (kg/inch) | N | N | 0.7 interface breakage | 0.3 interface breakage | 0.2 interface breakage |
| Evaluation | x | x | Δ | x | x |
| Thermal stability 150° C. × 1 day | x | x | ○ | ○○ | ○○ |

Com-Ex. = Comparative Example
N = impossible to measure

As shown in Table 1 and Table 2, the hot melt adhesives in Examples 1 to 8 comprise all of the four components, i.e. the component A, the component B, the component C, and the component D, so that adhesion property is excellent not only to a paper substrate but also to a polyolefin substrate. Furthermore, the hot melt adhesives in Examples 1 to 8 include the components having excellent compatibility with each other, resulting in excellent thermal stability. The hot melt adhesives are environmentally preferred due to the inclusion of the component B.

The hot melt adhesives in Comparative Examples 1 to 5 lack any one of the component A, the component B, the component C, and the component D (Table 3). Since the hot melt adhesives in Comparative Examples 1 and 2 do not comprise component A, the compatibility among the component B, the component C, and the component D is poor, resulting in poor thermal stability. Due to the poor compatibility among the respective components, the adhesion property of the hot melt adhesives in Comparative Examples 1 and 2 is below the level for evaluation. The hot melt adhesive in Comparative Example 3 does not comprise component B, and thus has poor adhesion property to a substrate, with extremely low shear strength, in particular. The hot melt adhesive in Comparative Example 4 does not comprise component D, and thus is merely a polymer composition, not a hot melt adhesive, and has poor adhesion property on the whole. The hot melt adhesive in Comparative Example 5 does not comprise component C, and thus has poorer adhesion property to a polyolefin substrate compared to the hot melt adhesives in Examples.

INDUSTRIAL APPLICABILITY

The present invention can provide a hot melt adhesive, and a vehicle interior material coated with the hot melt adhesive. The vehicle interior material of the present invention manufactured from a polyolefin substrate is particularly effective.

The invention claimed is:
1. A hot melt adhesive comprising:
   (A) a polar functional group-modified polymer,
   (B) an aliphatic polyester-based resin,
   (C) an olefin-based polymer that is a solid at room temperature, and
   (D) a tackifier resin.
2. The hot melt adhesive according to claim 1, wherein the polar functional group is at least one functional group selected from the group consisting of an acid anhydride group, a maleic acid group, a carboxyl group, an amino group, an imino group, an alkoxysilyl group, a silanol group, a silyl ether group, a hydroxyl group and an epoxy group.
3. The hot melt adhesive according to claim 2, wherein the polar functional group is at least one functional group selected from a maleic acid group or an amino group.
4. The hot melt adhesive according to claim 1, wherein the aliphatic polyester-based resin (B) comprises at least one selected from a polylactic acid-based resin and poly(butylene succinate).
5. The hot melt adhesive according to claim 1, comprising 5 to 60 parts by weight of component (C) to 100 parts by weight of total weight of components (A) to (D).
6. The hot melt adhesive according to claim 1 comprising:
   (A) an amino group group-modified SEBS polymer,
   (B) a polylactic acid resin,
   (C) an ethylene copolymer having propylene, butene or octene comonomers, and
   (D) a tackifier resin.
7. An article comprising the adhesive of claim 1.
8. The article of claim 7 which is a vehicle interior.
9. A hot melt adhesive comprising:
   (A) a polar functional group-modified olefin-based polymer that is an ethylene or α-olefin copolymer having 3 to 20 carbon atoms;
   (B) an aliphatic polyester-based resin,
   (C) an olefin-based polymer, and
   (D) a tackifier resin.

* * * * *